INVENTORS
ARTHUR C. ALBEE
& HUGH C. WARD
BY Morris A. Rabkin
ATTORNEY

Nov. 10, 1953 A. C. ALBEE ET AL 2,658,951

MAGNETIC SOUND SYSTEM

Filed Oct. 30, 1948 3 Sheets-Sheet 2

INVENTORS
ARTHUR C. ALBEE
& HUGH C. WARD
BY Morris A. Kahn
ATTORNEY

Nov. 10, 1953 A. C. ALBEE ET AL 2,658,951

MAGNETIC SOUND SYSTEM

Filed Oct. 30, 1948 3 Sheets-Sheet 3

INVENTORS
ARTHUR C. ALBEE
& HUGH C. WARD

BY [signature]

ATTORNEY

Patented Nov. 10, 1953

2,658,951

UNITED STATES PATENT OFFICE 2,658,951

MAGNETIC SOUND SYSTEM

Arthur C. Albee, Hollywood, and Hugh C. Ward, Los Angeles, Calif., assignors to Radio Corporation of America, a corporation of Delaware Application October 30, 1948, Serial No. 57,434

6 Claims. (Cl. 179—100.2)

This invention relates to sound recording and reproduction, and particularly to a combination photographic and magnetic sound system and a magnetic recording and reproducing system.

Magnetic sound recording has several advantages over photographic recording in the production of motion pictures, such as immediate playback and the ability to erase the record on the recording medium and use it over again. In the transposition from photographic sound recording to magnetic sound recording, many features of photographic sound recording equipment may be used. For instance, since the sound is recorded on traveling record mediums of similar form, such as a tape or film with sprocket hole perforations, it has been found that the photographic mechanisms for obtaining a constant speed of the film past the recording point may be utilized to good advantage. Much time and effort have been spent in obtaining a constant speed of advancement of a photographic sound medium past a sound recording or reproducing point, and such film drives are readily applicable for advancing a magnetic record medium. Furthermore, it is desirable that the same recorder be usable for both photographic and magnetic recording.

In general, it may be said that in their effort to meet the demand by motion picture producers for a synchronous sound reproducing mechanism employing magnetic film, engineers have been content to apply known principles to existing facilities which in general consisted of adding magnetic heads to standard optical motions. The object was to reduce film flutter as much as possible in apparatus of that kind without regard to the size and weight of the mechanism. The consequent result was that the recording head was placed adjacent the scanning drum which necessitated placement of the monitoring head in locations causing unnecessarily high film flutter.

The present invention is directed to a photographic recorder which permits recording a photographic record or a magnetic record using the same driving mechanism and film path, and, in addition, permits reproduction or erasing of the magnetic record so recorded, or any other magnetic record. The invention has also been embodied in a recorder for and reproducer of magnetic records alone, this new unit embodying some of the features of a photographic recording system.

The principal object of the invention, therefore, is to facilitate the recording of either photographic or magnetic sound records.

Another object of the invention is to provide improved photographic and magnetic recorders and reproducers.

A further object of the invention is to provide a recorder for photographic sound records and a recorder and reproducer of magnetic sound records in which the improved features of photographic recording are utilized for the advancement of both record mediums.

A still further object of the invention is to provide an improved magnetic recorder and reproducer adaptable for use in the usual processes of motion picture production.

With the foregoing objects in mind, my invention comprises a simple, compact magnetic recorder and reproducer in which film flutter is reduced to a minimum by mounting the head assembly in position to contact a reach of the film extending between an inertia controlled drum and a roller at points furthest removed from the points causing flutter disturbances. My invention also comprises the providing of tension rollers associated with a dashpot arrangement in close proximity to the inertia controlled flywheel.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
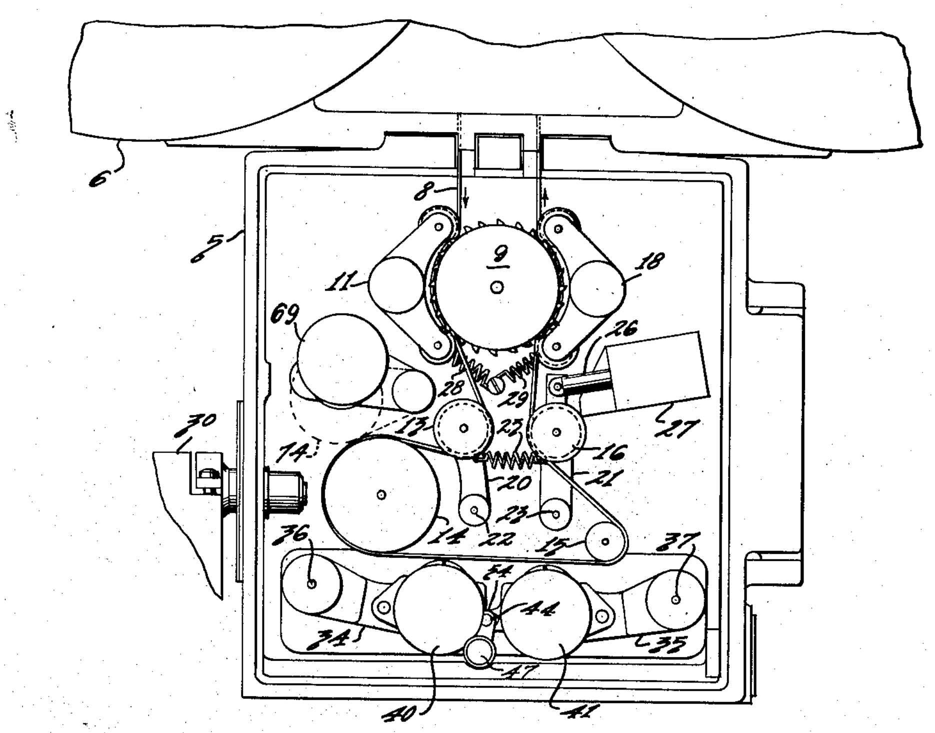
Fig. 1 is an elevational view of the essential elements of a combination photographic and magnetic recorder embodying the invention.

Referring now to the drawings, in which the same numerals identify like elements, a housing 5 has mounted, on the top thereof, a record medium magazine 6, the record medium 8, either photographic or magnetic, passing from the magazine to the left side of a sprocket 9 and held thereon by a pad roller mechanism 11. The type of magnetic record is in the form of film or tape of the same size and having the same perforations as a standard photographic film, either thirty-five millimeter or sixteen millimeter. Thus, either a photographic or magnetic record medium will be advanced through the recorder, if both are of the same size.

As shown by the arrows, the film 8 passes from the sprocket 9, around a film tensioning and guide roller 13, around an inertia controlled drum 14 which has a vibration damper in the form of either a solid flywheel or a rotary stabilizer mounted on the shaft thereof, around a fixed guide roller 15, around a film tensioning and guide roller 16, and back to the right side of sprocket 9, where it is held thereon by a pad roller mechanism 18. The film is then taken up in the magazine 6. The tension rollers 13 and 16 are mounted on arms 20 and 21, respectively, which are pivoted at 22 and 23. The arms 20 and 21 are interconnected by a coil spring 25, while the arm 21 extends beyond the roller 16 and has connected thereto a piston rod 26 operating in a dash pot 27. Springs 28 and 29 hold the pad rollers 11 and 18, respectively, in position on the sprocket 9. The amount of tension introduced in the film loops between the sprocket 9 and the drum 14 and roller 15, is such that the necessary contact pressure is obtained between the magnetic heads and the film, and also functions with the flywheel on the shaft of drum 14 and dashpot 27 to filter out both low and high frequency speed variations.

What is desired in a mechanism of this kind is a resonate frequency at the point where the sound recording and reproducing head contacts the film which is substantially below the frequency of any disturbance. By the use of the inertia controlled drum 14, and roller 15, of less inertia, a mechanical filter is provided, and the series arrangement of the drum and roller insures a progressively lower resonate frequency in the film as it passes around them than the frequency of the source, such as the sprocket, causing the disturbances.

An electrical analogue of the system are two inductive filters in series with the same current through both, wherein the variations in the current is averaged or smoothed out in series.

It is impracticable, however, to devise a mechanical filter system which will eliminate all vibrations in a device of this kind. Hence, viscous dampening, analogous to resistance in an electrical circuit, is incorporated in the system by providing a dashpot in close proximity to the drum to flatten the resonate peak frequencies. Such dashpot, therefore, contributes in the elimination of film flutter caused by the sprocket and minimizes the effect of film compliance as a dampening factor.

In Fig. 1, there is also shown a portion of an optical unit 30 which projects a light beam onto the film 8 and which may be of the type disclosed in copending application, Ser. No. 743,620, filed April 24, 1947. When a photographic film is advanced through the recorder, a modulated light beam will be impressed on the film in the manner of normal photographic recording. For this type of recording, the film path is as shown in Fig. 1.

Figure 2:
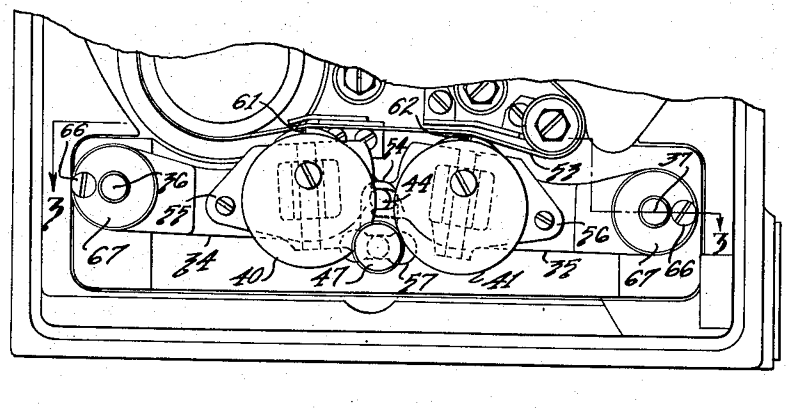
Fig. 2 is an enlarged, detailed view showing the positioning of the magnetic recording and reproducing heads of the invention.
Figure 3:
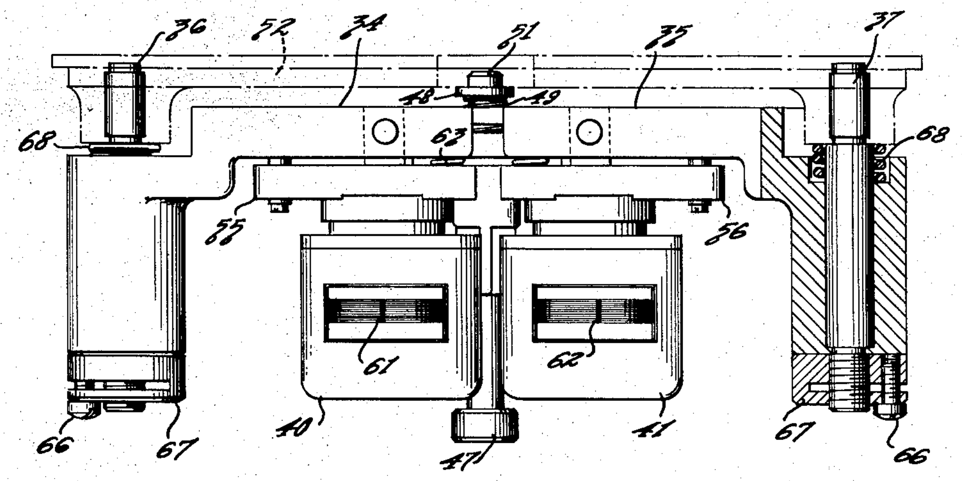
Fig. 3 is a plan view of the recording head and reproducing head mount taken along the line 3—3 of Fig. 2.
Figure 4:
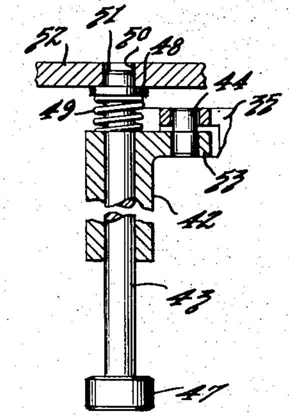
Fig. 4 is a detailed view of the positioning mechanism for the recording and reproducing head.

Referring now to Figs. 1 to 5, inclusive, Fig. 2 showing the film path for a magnetic record, two brackets 34 and 35 are pivotally mounted on shafts 36 and 37, respectively, the other ends of the brackets supporting a recording head 40 and a reproducing head 41. (See Fig. 3.) The arm 35 has, at its movable end, a drilled boss 42 in which is a rod 43 having a finger knob 47 and a fixed washer 48, between which and a shoulder of boss 42 is a spring 49. (See Fig. 4.) That is, the rod 43 may be moved axially against the tension of spring 49 to remove the rod end 51 from a hole 50 in the back wall 52 of the housing compartment. The boss also has an extension 53 in which is a pin 44, the pin 44 being between the ends of a yoke 54 on the end of arm 35. Thus, when end 51 is removed from the hole, the arms 34 and 35 may be simultaneously rotated on pivots 36 and 37, one position being as shown in Fig. 2, whereby the heads are in contact with a magnetic film 53, and the other position being shown in Fig. 1, whereby the heads are out of contact with the record medium, the end of rod 43 then being in a slot 57.

Figure 5:
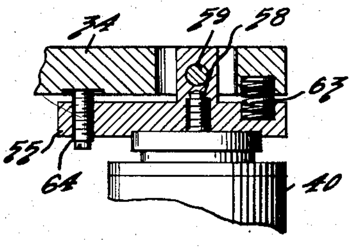
Fig. 5 is a detailed view of the orientation mechanism for the recording and reproducing heads.

Mounted adjacent the ends of arms 34 and 35 are the heads 40 and 41, these heads, as shown in Fig. 5, being mounted on plates 55 and 56 by means of a tap screw, such as shown at 58. The plates 55 and 56 are pinned to the respective arms by pins such as shown at 59, so that each head may be rotated on a substantially vertical axis to position the gaps 61 and 62 perpendicularly to the direction of motion of the film. To accomplish this adjustment, a tensioning spring 63 is positioned between one end of the plates and the respective arms, while the other ends of the plates are moved toward and away from the arms by means of screws, such as shown at 64. That is, by advancing the screw 64, the head is rotated in one direction, and backing the screw off will permit the spring to rotate the head in the other direction.

To position the heads 40 and 41 at their proper positions transversely of the film, the screws 66 may be loosened and the respective nuts 67 turned to either force the arms 34 and 35 in one direction against the tension of springs 68 or permit the springs to move the arms and heads in the opposite direction. Thus, all necessary adjustments may be easily made to position the gaps 61 and 62 in the correct position with respect to the film. As mentioned above, the head 40 is a record head, and the head 41 is a reproducing head. To accomplish erasing, a head 69 is provided which may be positioned as shown in full lines in Fig. 1 during photographic recording, and to the dotted line position 74 in contact with the film 8 during magnetic recording. Erasing energy is supplied to the erasing head when it is desired to erase any portion of the magnetic sound record. This unit, therefore, will record a photographic record, record a magnetic record, reproduce a magnetic record, or erase a magnetic record, and is well adapted to motion picture production where either type of record may be needed at a particular time.

Figures 6, 7, 8:
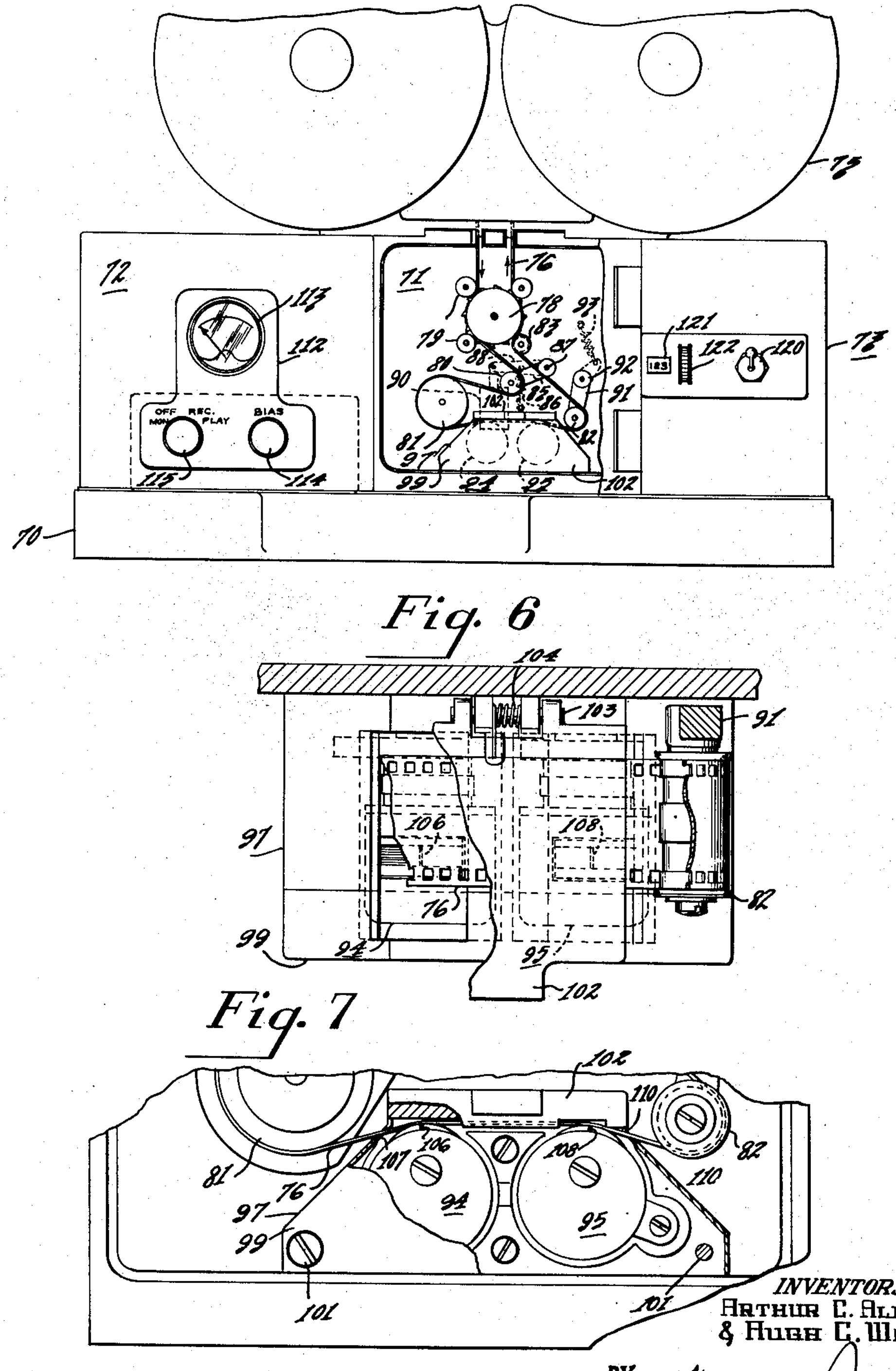
Fig. 6 is an elevational view of a magnetic recorder and reproducer.
Fig. 7 is a plan view of the recording and reproducing heads.
Fig. 8 is an enlarged, detailed view of the shielding mount for the recording and reproducing heads.

Referring now to Figs. 6, 7, and 8, an all-magnetic recorder is shown, in which a base 70 carries a housing having a central compartment 71, a left-hand compartment 72, and a right-hand compartment 73. On top of the housing is a magazine 75 similar to the magazine 6 in Fig. 1. A magnetic tape 76, which may be either thirty-five or sixteen millimeter with sprocket tooth perforations, passes from the magazine over the left-hand side of a sprocket 78, under pad rollers 79, around a film tensioning roller 80, a drum 81, which may have a flywheel mounted on the shaft thereof, a film tensioning roller 82, to the right-hand side of sprocket 78, under pad rollers 83, and back to the magazine 75. The roller 80 is mounted on an arm 85 to which is attached a spring 86 for tensioning the film. The arm 85 is pivoted at 87 and has connected thereto another arm 88, at the end of which is a piston rod of a damping dashpot 90. The roller 82 is mounted on an arm 91, which is pivoted at 92. An extension of the arm 91 is connected to a spring 93. Thus, the tensioning system for this form of film drive eliminates one of the tensioning rollers, such as 16, in the combination photographic and magnetic film drive, since roller 82 functions under tension instead of being fixed as in Fig. 1.

In contact with the portion of the magnetic film between drum 81 and roller 82 is a recording head 94 and a reproducing head 95, these heads being mounted for rotational adjustment, similarly to the heads 40 and 41 in the first modification of the recorder. However, in this all-magnetic recorder, the heads are in a shielding mount 97, which has been milled to closely conform to the outside form of the heads, has a front plate 99 attached to the shield 97 by screws, such as shown at 101, and a cover 102, hinged at 103, and held closed under tension of a spring 104. As shown in Fig. 8, the magnetic film 76 passes from the drum 81 to the gap 106 through an opening 107 between the upper tapered end of the shield 97 and the cover 102. The film then passes to the gap 108 of the head 95 and then to the roller 82 through an opening 110 formed between the right-hand edge of the mounting and the cover 102. This shield prevents interference of stray magnetic fields from the motor or other electrical elements from affecting the heads.

In the left-hand compartment 72 of the housing, is an oscillator-amplifier combination 112 provided with a meter 113, a bias potentiometer control 114, and a switch 115 for making connections for the bias current for recording and for switching the input and output of the amplifier during recording and reproduction. The right-hand compartment contains the motor, the on and off motor switch 120, and a counter 121 with its resetting wheel 122.

This all-magnetic recorder provides a film motion comparable to high quality photographic film recorders and reproducers, it may be easily operated by operators familiar with photographic recorders and reproducers, and it will both record and reproduce magnetic records. If desired to use an erase head in this unit, it may be provided in the same manner as shown in Fig. 1 of the combination photographic and magnetic unit.

We claim:

1. A magnetic sound recorder and reproducing mechanism, comprising a sprocket, a speed stabilizing drum, a guide roller, said magnetic record medium passing over said sprocket around said drum, over said guide roller, and to said sprocket, tensioning and damping means contacting the portions of said magnetic record medium between said sprocket and said drum and guide roller, said tensioning means tensioning the portion of said magnetic record medium between said drum and guide roller, magnetic recording and reproducing heads in contact with said record medium between said drum and said guide roller, means for adjusting said heads with respect to said record, and a shield surrounding said heads, said shield having a hinged cover with openings at the ends thereof to permit passage of said record to and from said heads.

2. A magnetic sound recorder and reproducer drive mechanism comprising sprocket means for advancing film into a loop, a pair of film-pulled rollers in said loop around which said film is advanced by said sprocket means, means for tensioning and damping the portions of said film between said sprocket means and said rollers, said means also applying tension to said film between said rollers, magnetic recording and reproducing heads positioned against said film between and adjacent said rollers, and means connected to at least one of said rollers for stabilizing the rotation of said roller and the motion of said film between said rollers.

3. A magnetic recorder-reproducer of the drum roller film-driven filter system type comprising a sprocket for advancing a magnetic record medium through the mechanism, a spaced inertia controlled drum and a roller for guiding said medium in substantially a straight path, means positioned between said drum-roller guide and said sprocket for tensioning and damping said record medium, magnetic heads positioned between said drum and roller for contacting said record medium to record sound signals thereon and to reproduce sound therefrom, and means for adjusting said heads with respect to said medium.

4. A sound film apparatus in accordance with claim 3, in which the tension rollers are mounted on pivoted arms and the said arms are resiliently connected together.

5. A sound film apparatus comprising a sprocket adapted to advance a film thereover, film driven inertia controlled drum and roller disposed in spaced relation to each other and around which the film is adapted to advance, tension rollers pivotally mounted between said sprocket and said drums and adapted to contact the approach and retreat sides of said film to take up slack therein, a shock arresting device associated with at least one of said rollers, means incorporated in said apparatus for dampening oscillations of said drum when a film is passing therearound, and a magnetic sound recording and reproducing head disposed in position to contact the reach of a film between said drum and roller.

6. Sound film apparatus comprising a mounting plate, sprocket means mounted on said plate and adapted to advance a film thereover, an inertia controlled impedance drum and roller mounted on said plate in spaced relation to each other and around both of which said film is adapted to advance, stabilizing means for said drum, tensioning rollers pivotally mounted on said plate between said sprocket means and said drum, means for actuating said tensioning rollers to take up slack in said film and tension said film between said drums, means for damping movement of said tension rollers, and a magnetic sound head mounted on said plate in position to contact the reach of said film between said drum and roller.

ARTHUR C. ALBEE.
HUGH C. WARD.

(References on following page)

References Cited in the file of this patent

UNITED STATES PATENTS

| Number | Name | Date |
|---|---|---|
| 1,756,864 | Hoxie | Apr. 29, 1930 |
| 1,965,173 | Canton | July 3, 1934 |
| 2,102,895 | Hasbrouck, Jr. | Dec. 21, 1937 |
| 2,213,631 | Keller | Sept. 3, 1940 |
| 2,416,606 | Zimmerman | Feb. 25, 1947 |
| 2,442,400 | Collins | June 14, 1948 |
| 2,468,198 | Keller | Apr. 26, 1949 |
| 2,479,869 | Rosemann | Aug. 23, 1949 |
| 2,530,029 | Pond | Nov. 14, 1950 |
| 2,532,761 | Blasio | Dec. 5, 1950 |
| 2,536,030 | Camras | Jan. 2, 1951 |
| 2,538,981 | Ross | Jan. 23, 1951 |
| 2,540,406 | Ranger | Feb. 6, 1951 |
| 2,550,916 | Davis | May 1, 1951 |
| 2,558,432 | Haloski | June 26, 1951 |

FOREIGN PATENTS

| Number | Country | Date |
|---|---|---|
| 618,349 | Great Britain | Feb. 21, 1949 |
| 899,195 | France | Oct. 23, 1943 |

OTHER REFERENCES

S. M. P. E. Journal, November 1948, pages 481–488.